(No Model.)

P. S. RYAN.
MILK STRAINER.

No. 356,555. Patented Jan. 25, 1887.

Witnesses:
Edward L. Mills.
L. Seward Bacon

Inventor:
Patrick S. Ryan.
By Ellsworth Atty.

United States Patent Office.

PATRICK S. RYAN, OF RUTLAND, VERMONT.

MILK-STRAINER.

SPECIFICATION forming part of Letters Patent No. 356,555, dated January 25, 1887.

Application filed July 27, 1886. Serial No. 209,196. (No model.)

*To all whom it may concern:*

Be it known that I, PATRICK S. RYAN, a citizen of the United States, residing at Rutland, in the county of Rutland and State of Vermont, have invented certain new and useful Improvements in Milk-Strainers; and I do hereby declare the following to be a full, clear, and exact description of the invention, such as will enable others skilled in the art to which it appertains to make and use the same.

My invention relates to milk-strainers; and it consists in the construction and arrangement of the parts, which will be more fully hereinafter described, and pointed out in the claims.

This invention is an improvement on the strainer set forth in Letters Patent No. 109,763, granted to me November 29, 1870.

One object of my present invention is to provide a milk-strainer of such construction as to adapt it to guard against a dashing over or overflow, and of such shape that the milk undergoing the process of straining will have more or less of the animal heat extracted therefrom, which will be absorbed and escape by and through the surrounding atmosphere in contact with the exposed extensive surface of the said strainer.

A further object of my invention is to provide a strainer with compound straining means, together with a depository-receptacle for sediment, thereby not only expediting the straining process, but at the same time providing means for keeping the straining-sieves free from dust and rendering them in a condition to be at all times effective in their operation.

A still further object of my invention is to provide a milk-strainer having a suitable support to be used with any form of receptacle, of simple and effective construction, strong and durable, readily understood and used, easily handled, and cheaply manufactured.

I attain these objects by the device illustrated in the accompanying drawings, wherein like letters of reference indicate similar parts in both views, and in which—

Figure 1:
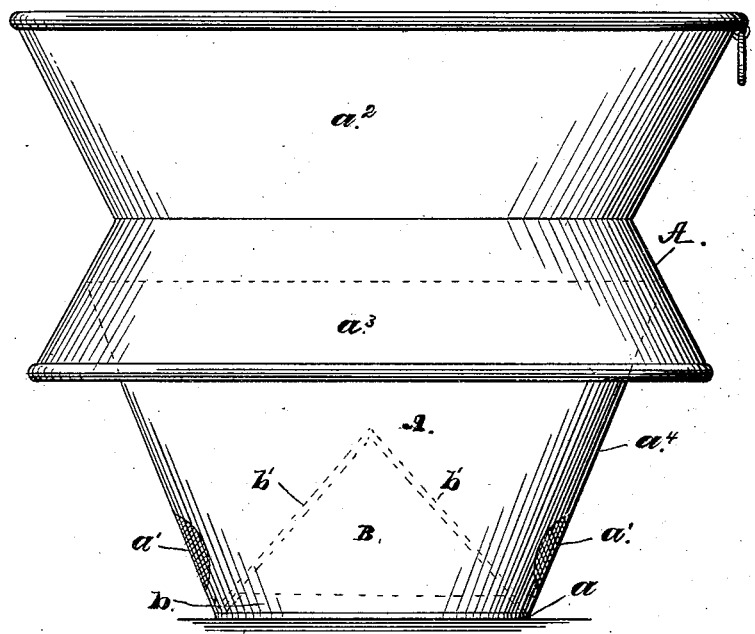
Figure 2:
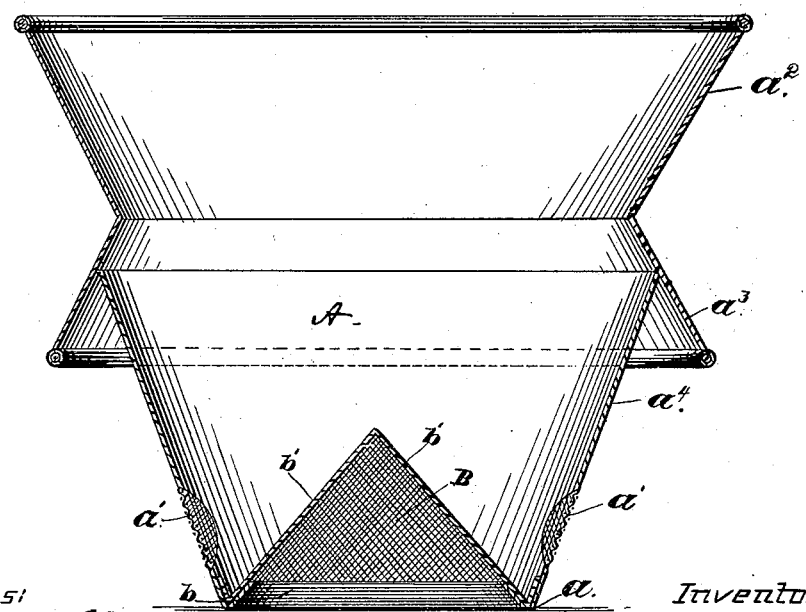

Figure 1 is a side elevation of my improved milk-strainer. Fig. 2 is a longitudinal vertical section of the same.

A indicates the strainer-body, which is constructed of conical shape or in the form of an inverted frustum of a cone. As in the ordinary form of strainers of this contour, the smallest diameter is at the bottom $a$, which has in this instance a conical sieve, B, connected thereto, which extends upwardly into the body of the strainer as far as it is necessary. Secured to the rim of the bottom opening of the strainer is a metallic strip, $b$, which extends upward and engages with the conical sieve B, forming a support therefor, and also providing a suitable depository-receptacle for sediment between the said conical sieve and the sides of the strainer. The sieve B is further strengthened or re-enforced by metallic supports $b'$ $b'$, connected to and extending from the strip $b$, which assume the same inclination as and are in contact with the sides of the conical sieve, meeting at the apex thereof, where they are secured to each other. By this means the said sieve is protected and prevented from sagging or depression by the pressure of the milk in the process of straining. Adjacent to the bottom of the strainer and to the conical sieve, one or more circular sieves, $a'$ $a'$, are inserted in the strainer-body proper. These circular sieves materially aid in a rapid egress or straining of the milk, being situated such a distance above the bottom rim as to preserve the effectiveness of the depository-receptacle for what sediment may be contained in the milk.

The upper portion of the strainer is constructed in the form of a flaring flange, $a^2$, and, extending downward some distance, meets and is secured to a downwardly and outwardly projecting flange, $a^3$. This flange or outward depression $a^3$ is formed by a flanged rim, which extends downward and outward from the main body of the strainer, and forms a support for the strainer entire when used in connection with pans, milk-cans of varying sizes, and other receptacles in the act of straining. The lower wall, $a^4$, of the strainer is secured to the said flange $a^3$ a short distance below the lower edge of the flared top $a^2$, thus forming a short projection or guard between the lower portion, $a^4$, of the body of the strainer and the upper flared portion, $a^2$.

The upper flared portion of the strainer can be extended or increased in size as may be desired, and the supporting-flange $a^3$ may also be of suitable form and dimensions.

When the strainer is used, it is placed in the mouth or opening of the containing-receptacle with the flange $a^3$ resting on the upper rim thereof, and the milk is poured therein without danger of upsetting the strainer, which is suitably braced by the said supporting-rim. When the milk is poured into the strainer, it strikes the recess formed by the outwardly-extending flange $a^3$ below and under the upper flaring top flange, $a^2$, and the milk is prevented from slopping over the upper flared portion of the strainer, and passes down through the straining-sieves heretofore described. The flaring top portion, $a^2$, of the strainer also aids in retaining the milk within the strainer, and at the same time provides an extended and exposed surface of the milk to the surrounding atmosphere, which absorbs the animal heat contained in the milk, which absorption is also aided by the outside exposed surface of the strainer.

This form of strainer can be readily used in cans of varying sizes as well as in shallow pans. The upward and outward extending flange or rim acts to increase the containing capacity of the strainer, and by said construction the straining of large quantities of milk is greatly expedited, and the strainer entire is rendered convenient and useful.

The sediment-containing receptacle adjacent to the sieves can be readily cleaned when desired, and the milk thus rendered pure, clean, and in better condition for use.

The several parts can be increased in dimension and constructed of any suitable metal other than tin, which is preferably used, without departing from the nature and principle of my invention.

I am aware that milk-strainers have been constructed with conical-shaped body portions having rests, and with conical upwardly-extending sieves and side sieves with depository-gutters or small depressions between the said sieves and the lower portions of the strainers, and such constructions I do not claim, broadly: but What I do claim as new, and desire to secure by Letters Patent, is—

1. In a milk-strainer, the combination of an upwardly and outwardly flared top flange or rim, $a^2$, having a supporting-flange, $a^3$, extending downwardly and outwardly from the lower edge thereof, the point where the two flanges join being depressed inwardly, a conically-shaped body portion secured to the inner surface of the lower flange, $a^3$, below and under the depression of the two flanges, and suitable straining-sieves, as $a'$, arranged in the lower portion of said body portion, substantially as described.

2. In a milk-strainer, the combination of an upwardly and outwardly flared top flange, $a^2$, having a flange, $a^3$, extending downwardly and outwardly therefrom and forming an inward depression at their point of joining, a body portion, A, attached to the inner surface of the flange $a^3$, strainers $a'$ $a'$, arranged in the lower portion of said body, and a conical sieve, B, having supporting-strips $b'$, and a trough, $b$, extending up into the central portion of the body from the bottom thereof, substantially as described.

In testimony whereof I affix my signature in presence of two witnesses.

PATRICK S. RYAN.

Witnesses:
CHARLES H. JOYCE,
JOEL C. BAKER.